(12) United States Patent
Pfalzgraf et al.

(10) Patent No.: US 6,565,149 B2
(45) Date of Patent: May 20, 2003

(54) MOTOR VEHICLE ROOF WITH TWO COVERS AND A HEADLINER FOR ONE SUCH MOTOR VEHICLE ROOF

(75) Inventors: Manfred Pfalzgraf, Herrsching (DE); Francois De Gaillard, Mouilleron en pareds (FR); Bernd Schleicher, München (DE); Walter Schätzler, Starnberg (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/803,371

(22) Filed: Mar. 12, 2001

(65) Prior Publication Data

US 2001/0028181 A1 Oct. 11, 2001

(30) Foreign Application Priority Data

Mar. 10, 2000 (DE) .......................... 100 11 339
Apr. 17, 2000 (DE) .......................... 100 19 199

(51) Int. Cl.⁷ .................................................. B60J 7/00
(52) U.S. Cl. .................. 296/217; 296/214; 296/220.01; 296/221; 296/222
(58) Field of Search ................................ 296/214, 217, 296/220.01, 221–223

(56) References Cited

U.S. PATENT DOCUMENTS

| 4,852,938 | A | * | 8/1989 | Hirshberg et al. .......... 296/214 |
| 4,911,497 | A | | 3/1990 | Schreiter et al. |
| 5,002,334 | A | * | 3/1991 | Meiler et al. ............... 296/214 |
| 5,601,330 | A | | 2/1997 | Ulbrich et al. |

FOREIGN PATENT DOCUMENTS

| DE | 40 41 908 | 1/1992 |
| EP | 0 854 061 | 7/1998 |

* cited by examiner

*Primary Examiner*—Dennis H. Pedder
(74) *Attorney, Agent, or Firm*—Nixon Peabody LLP; David S. Safran

(57) ABSTRACT

A motor vehicle roof having a fixed roof structure with two successive roof openings, a fixed roof section being disposed between the roof openings, displaceable covers which cover the roof openings and are selectively movable to at least partially clear the roof openings, the respective covers being selectively movable longitudinally and being selectively pivotable into a ventilation position about a transverse axis of at least one of a front edge and a rear edge of the cover, and being selectively movable longitudinally so as to be positioned underneath the fixed roof section.

13 Claims, 4 Drawing Sheets

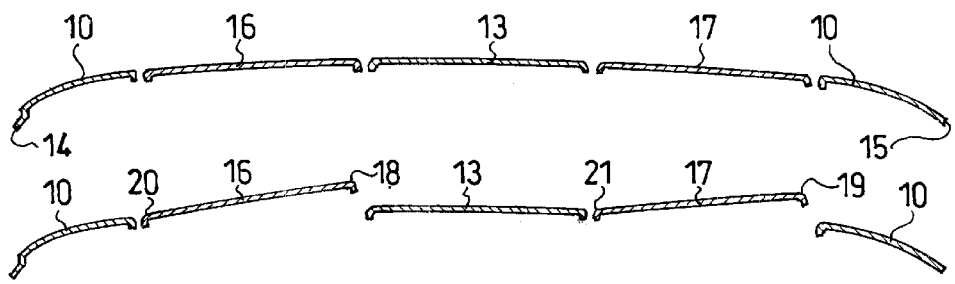
FIG.2A
FIG.2B
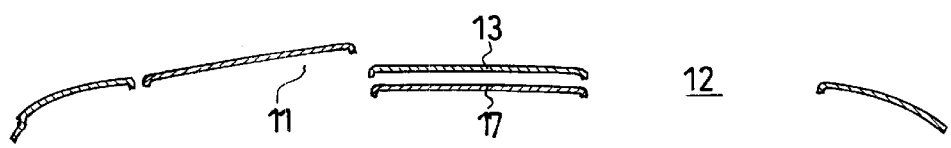
FIG.2C
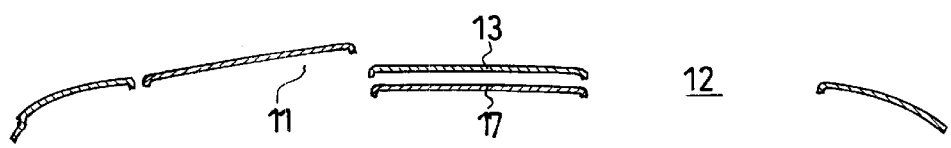
FIG.2D
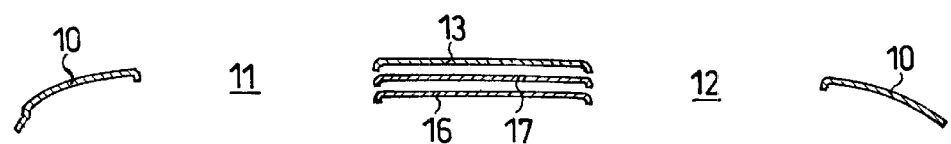
FIG.2E
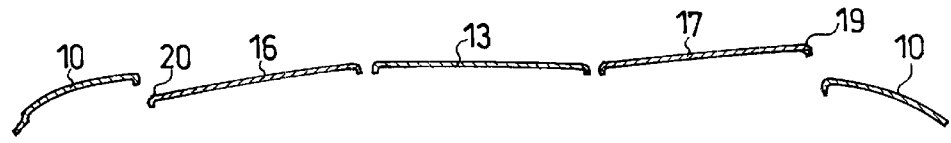
FIG.2F
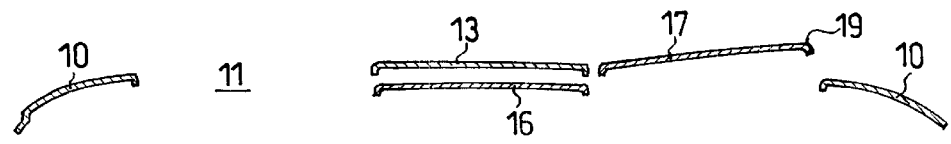
FIG.2G
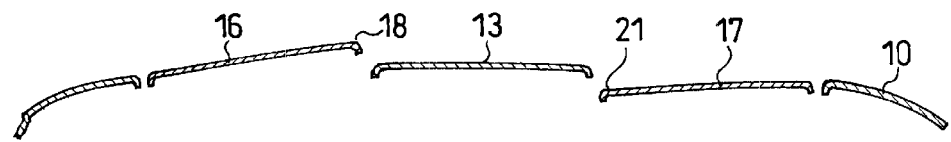
FIG.2H
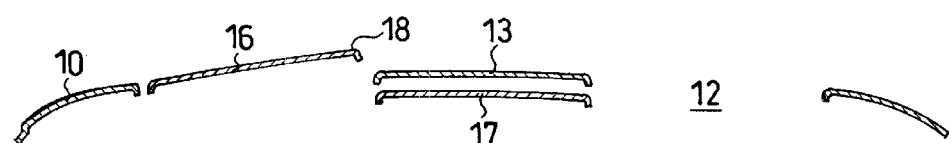
FIG.2I
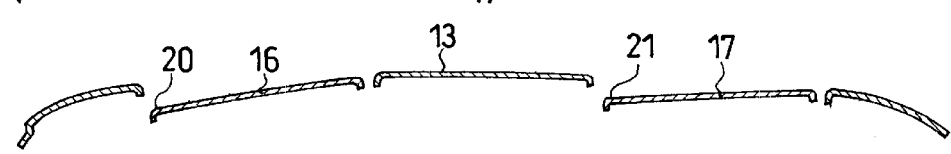
FIG.2J

MOTOR VEHICLE ROOF WITH TWO COVERS AND A HEADLINER FOR ONE SUCH MOTOR VEHICLE ROOF

BACKGROUND OF THE INVENTION

1 Field of the Invention

The present invention is directed to a motor vehicle roof including a fixed roof structure having front and rear roof openings, a fixed roof section disposed between the front and rear roof openings, two covers for closing a respective roof opening, whereby at least one of the covers is selectively movable longitudinally from a closed position into an open position to at least partially expose a respective roof opening, and whereby each cover is pivotable out of the closed position into a ventilation position. The invention furthermore relates to such a roof with front and rear headliner units, whereby the front headliner unit can be pushed out of the cover position which is assigned to the front cover to the rear to under the stationary fixed roof structure, and whereby the rear headliner unit can be pushed out of the cover position assigned to the rear cover forward to under the stationary fixed roof structure.

2. Description of the Prior Art

European Patent Publication EP 0 854 061 A1 describes one such motor vehicle roof with two roof openings, whereby the rear edge of a front cover and a rear cover can be raised with respect to the front edge of the cover by a pivoting-out mechanism into a ventilator position and can be lowered to move in a position under the stationary fixed roof structure.

In the known roofs with two openings with respective covers and headliners, the two comparatively large-area headliner elements are guided on respective guide rails located with a vertical offset with respect to one another under the fixed roof structure so that they can be stowed at the same time on top of one another under the stationary fixed roof structure. However, the free head space for vehicle passengers is reduced by the guide rail which has been offset downward.

SUMMARY OF THE INVENTION

In view of the foregoing, an object of the present invention is to provide a motor vehicle roof in which optimized ventilation of the motor vehicle can be achieved by various cover positions.

Another object of the present invention is to provide a headliner for a motor vehicle roof which can be stowed under the stationary fixed roof structure of the roof in its open position with little space requirement.

These and other objects may be achieved in accordance with the motor vehicle roof of the present invention in that the respective rear edges of the front cover and the rear cover are upwardly pivoted about their front edges into respective ventilator positions. The rear edges are upwardly pivoted by pivoting the cover about a transverse axis at their front edges or in the fixed roof area around the front edges of the covers. Accordingly, two sliding and pivoting roofs are combined, and the rear sliding and lifting roof or the rear cover is selectively movable forward by a guide means out of a closed position so as to be positioned under the stationary fixed roof structure.

These and other objects are also achieved in that the front cover can be lowered about its rear edge into a ventilator position and the rear cover can be raised about its front edge into a ventilator position. The front cover, as a result of the lowering of its front edge, may be called a "front vent". Using the lowered front edge on the front cover and the raised rear edge of the rear cover, two ventilation openings which are distant from one another are made available with improved ventilation action for the entire motor vehicle interior.

Furthermore, these and other objects are achieved in accordance with the present invention in that the front cover can be raised about its front edge into its ventilator position and the rear cover can be lowered about its rear edge into its ventilator position.

Finally, these and other objects are achieved in accordance with the present invention in that the front cover and the rear cover can be lowered on their respective front edges around their respective rear edges into their respective ventilator positions.

If, in one preferred embodiment of the motor vehicle roof, there is a pivotable wind deflector in front of the front cover, by raising the wind deflector, a draft can be produced for ventilating the interior of the motor vehicle. For the front cover which can be lowered on its front edge, a clearly larger ventilation opening can be set when the pivoted-out wind deflector also clears an additional opening.

The object is achieved with respect to the aforementioned headliner in that the two headliner units are guided essentially in a common plane near the roof and out of their cover positions in the direction to their open positions under an intermediate portion of the stationary fixed roof structure, and that at least one of the two headliner units is divided in the longitudinal direction into at least two headliner elements which can be displaced or pivoted relative one another, and during its displacement to under the intermediate portion of the stationary fixed roof structure, it is guided from its arrangement near the roof to under the other headliner unit. The division of the large-area headliner unit into at least two or more headliner elements which are shorter in the longitudinal direction makes the headliner unit flexible around one or more transverse axes such that it can be moved into a stowed position and can be deposited therein, and the guides to the stowage position can be located near the roof. In this way, the head space for the vehicle passengers is not unduly limited.

The headliner unit can have individual, separate elements which can be flexibly or pivotably joined to one another, or alternatively, it can be made in one piece with sections divided in the longitudinal direction with varied bending flexibility in order, for example, to be able to follow a guideway which is bent in a S-shape. Preferably, one headliner unit is movably supported on a guide which essentially follows the roof contour and which extends from the assigned cover to under the stationary fixed roof structure, and the other headliner unit is movably guided on a guide which runs, in the area of the stationary fixed roof structure, underneath the other guide. If the two headliner units can be moved independently of one another according to the requirements of the vehicle passengers, also only one of the headliner elements can be partially or completely closed.

Embodiments of the motor vehicle roof and the headliner are explained in detail below with reference to the drawings.

BRIEF DESCRIPTION OF THE DRAWINGS

FIGS. 2A to 2J show schematic side views of the motor vehicle roof in various positions of the covers of the roof openings;

DETAILED DESCRIPTION OF THE INVENTION

Figure 1:
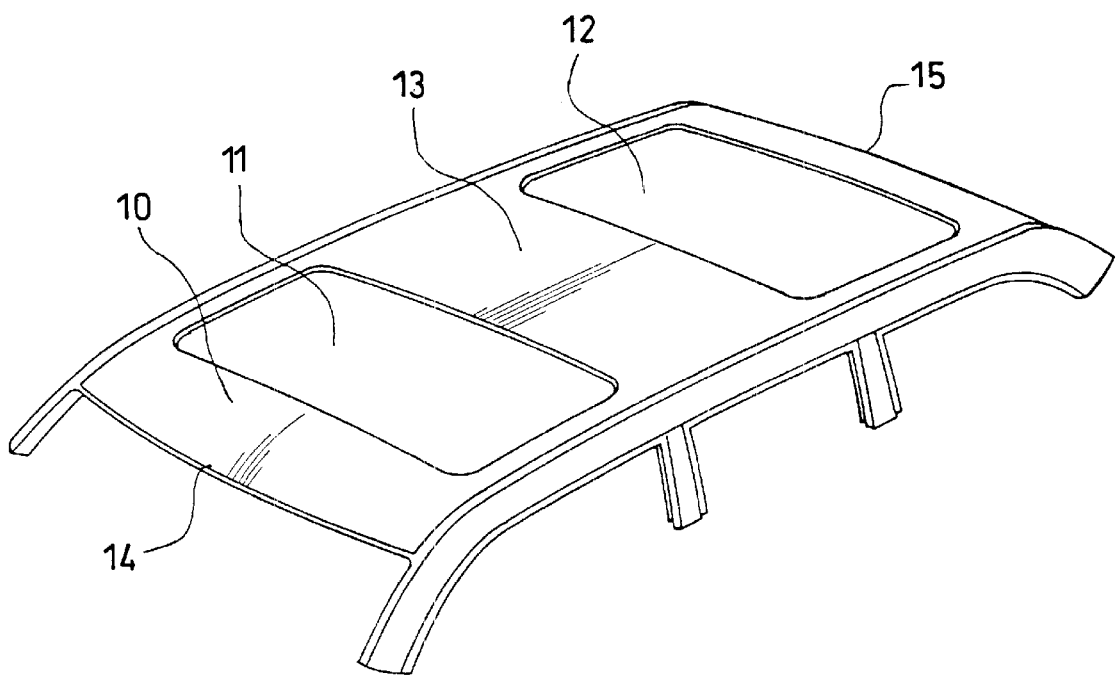
FIG. 1 is a perspective view a roof of a motor vehicle in accordance with the present invention.

As illustrated by FIG. 1, a motor vehicle roof has a fixed roof structure 10 with two successive roof openings 11, 12 of substantially the same size, and which are separated by an intermediate portion 13 of the fixed roof structure 10. The front roof opening 11 is located proximate a front edge 14 of the roof structure 10, while the rear roof opening 12 is located near the rear edge 15 of the roof structure 10. On the bottom of the roof structure 10, a frame (not shown) is attached which has guide rails on either side in which, as shown in FIG. 2, a front cover 16 and a rear cover 17 are slidably supported for movement in the longitudinal direction of the motor vehicle.

The front and rear covers 16, 17 are each provided with a pivoting mechanism (not shown) by which the respective rear edges 18, 19 of the front cover 16 and the rear cover 17 can be raised or lowered into respective ventilator positions with respect to the front edges 20, 21 of the covers, or the respective front edges 20, 21 of the covers can be raised or lowered with respect to the rear edges 18, 19 of the covers. Moreover, the front and rear covers 16, 17 can be raised or lowered about their respective front edges 20, 21 or their respective rear edges 18, 19, or one of the covers 16, 17 can be raised or lowered about its front edge 20, 21 and the other cover 16, 17 can be raised or lowered about its rear edge 18, 19. To provide the pivoting motion and longitudinal displacement motion along the guide rails, the front and rear covers 16, 17 are each driven by a separate drive which can be made in the known manner, such as an electric motor with a pinion and compressively-stiff drive cables; see, for example, U.S. Pat. No. 4,911,497 which hereby incorporated by reference. The covers 14, 15 are preferably transparent and are especially glass covers. As shown in FIG. 2D, under the intermediate section 13 of the fixed roof 10, the front and rear covers 16, 17 have separate guide rails located on top of one another, by which the covers 16, 17 can be selectively moved to positions on top of one another underneath the intermediate section 13 of the fixed roof.

In the closed position of the motor vehicle roof shown in FIG. 2A, the front cover 16 closes the front roof opening 11 while the rear cover 17 closes the rear roof opening 12. FIG. 2B shows a position in which the rear edge 18 of the front cover 16 and the rear edge 19 of the rear cover 17 are raised for ventilation purposes. They are the ventilator positions of conventional sliding and lifting roofs. In FIG. 2C, the rear cover 17 is moved forward out of its closed position along its guide rails and pushed entirely underneath the intermediate section 13 in order to completely clear the rear roof opening 12. In FIG. 2D, the front cover 16 is additionally moved to the rear out of its closed position as shown in FIG. 2A along its guide rails and is pushed completely underneath the rear cover 17 and the intermediate section 13 to completely clear the front roof opening 11.

In another embodiment as shown in FIG. 2E, the front cover 16 can be lowered on its front edge 20 into a ventilator position, while the rear edge 19 of the rear cover 17 is raised. As shown in FIG. 2F, to completely open the front roof opening 11, the front cover 16 can be pushed to the rear to a position underneath the intermediate section 13. In addition, the rear cover 17 can be pushed forward out of its closed position to under the intermediate section 13, according to the arrangement of the respective guide rails, both the front cover 16 and also the rear cover 17 being held directly underneath the intermediate section 13 and the other cover at the time being held under it.

In the motor vehicle roof shown in FIG. 2G, the front cover 16 can be raised at its rear edge 18 into a ventilator position, while the front edge 21 of the rear cover 17 is lowered. As shown in FIG. 2H, for complete opening of the rear roof opening 12, the rear cover 17 is pushed out of its closed position forward to underneath the intermediate section 13. In addition, the front cover 16 can be pushed out of its closed position to the rear to under the intermediate section 13. As shown in FIG. 2I, in another embodiment of the motor vehicle roof, both the front cover 16 and also the rear cover 17 can be lowered at their forward edges 20, 21 into ventilator positions. As shown in FIG. 2J, to completely open the roof openings 11, 12, the front cover 16 and the rear cover 17 can be pushed to under the intermediate section 13.

Control of the drives for the covers 16, 17 is made such that the pivoting motions of the covers 16, 17 and also their longitudinal displacement motions into respective positions underneath the intermediate section 13 can be executed independently of one another. Collision of the covers 16, 17 are prevented during the displacement to positions underneath the intermediate section 13 by the arrangement of the guide rails. Thus, in the embodiments of the motor vehicle roof shown in FIGS. 2A to 2J, the intermediate section 13, instead being made of as a fixed section of the fixed roof structure 10, can also be made as a separate, transparent or opaque fixed roof section composed of at least one of glass, plastic and metal. Furthermore, when made of glass or plastic, it can be provided with a photovoltaic coating in order to produce current for at least one of auxiliary ventilation of the motor vehicle independent of the motor vehicle battery and electrically charging the motor vehicle battery.

The embodiments of the motor vehicle roof shown in FIGS. 3A to 3E are formed basically like the above described embodiments, but include a wind deflector 22 which is located between the front edge 14 of the roof structure 10 and the front cover 16, and whereby a rear edge 23 of the deflector 22 can be pivoted upward about its front edge 24. The wind deflector 22 can be made as a louver which is located as a layered fixed roof section positioned flush on the roof structure 10 and can be pivoted upwardly out of this flush arrangement so that the fixed roof section which remains underneath the louver 22 preserves its fixed arrangement.

Figure 3A:
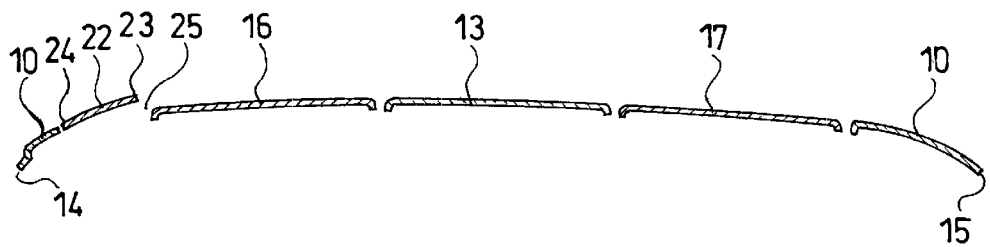
FIGS. 3A to 3E show side views of the motor vehicle roofs with a wind deflector in various positions of the covers of the roof openings.

As shown in FIG. 3A, in an alternative embodiment, the wind deflector 22 forms a movable fixed roof section for the roof structure 10 and can be pivoted upwardly as a wind deflector unit of the roof structure 10 in its entirety. Thus, the wind deflector 22 can create a larger ventilation opening 25 between the raised rear edge 23 of the wind deflector 22 and the front edge 20 of the front cover 16 which is in its closed position. The wind deflector 22 can be used in all the motor vehicle roofs shown in FIGS. 2A to 2J. Thus, the front cover 16 and the rear cover 17 with their raising mechanisms can be formed such that they are either lowered on their front edges 20, 21 or raised on their rear edges 18, 19 into ventilator positions, and the front cover 16 can be pushed to the rear to under the intermediate section 13 and the rear cover 17 can be pushed forward to under the intermediate section 13.

Figure 3B:
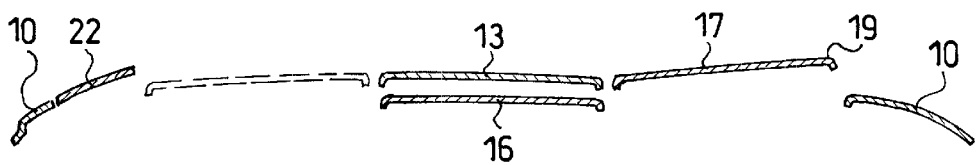
Figure 3C:
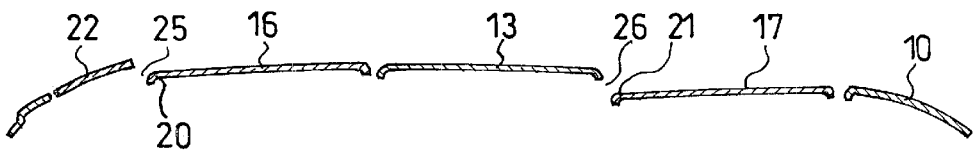

FIG. 3B shows a position in which the front cover 16 is pushed out of its closed position to the rear to a position underneath the intermediate section 13 and the rear cover 17 is raised on its rear edge 19 into the ventilator position. As shown in FIG. 3C, the rear cover 17 is lowered on its front edge 21 into the ventilator position. When the front cover 16 is closed, the front ventilation opening 25 which is formed by the raised wind deflector 22 and the ventilation opening 26 which is cleared by the rear cover 17 also yield draft-free and still good ventilation.

Figure 3D:
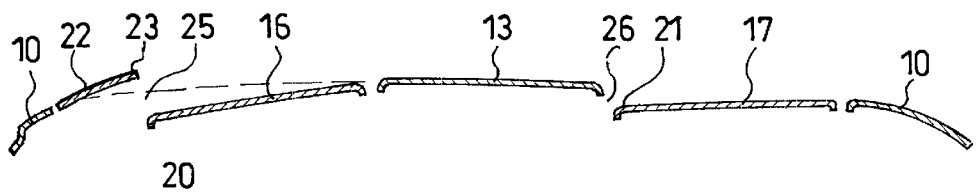
Figure 3E:
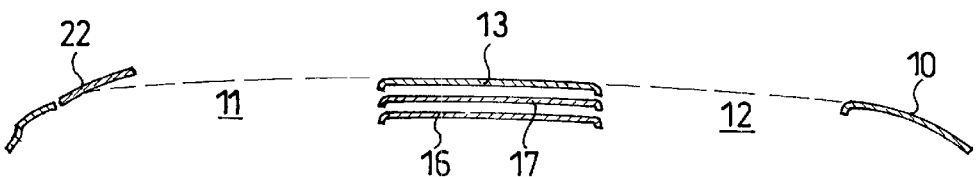

The version of the motor vehicle roof shown in FIG. 3D contains a front cover 16 which can be lowered with its front edge 20 into the ventilator position. With the wind deflector 25 pivoted upward, between the rear edge 23 of the wind deflector 22 and the front edge 20 of the front cover 16 lowered relative to the closed position (shown by the broken line), thus a much larger front ventilator opening 25 is formed which, in conjunction with the ventilator opening 26 which has been cleared by the rear cover 17, enables even more improved ventilation by air circulation from the interior through the front ventilator opening 25 to the outside over the intermediate section 13 and though the rear ventilator opening 26 back into the interior. FIG. 3E shows the motor vehicle roof with the two covers 16, 17 in the open position under the intermediate section 13 and with the wind deflector 22 pivoted upward.

Figure 4A:
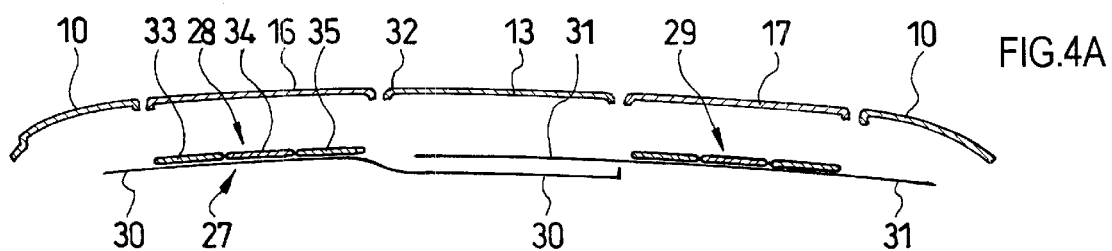
FIGS. 4A to 4C show side views of a headliner for the motor vehicle roof in the open and closed position of the roof and of the headliner.
Figure 4B:
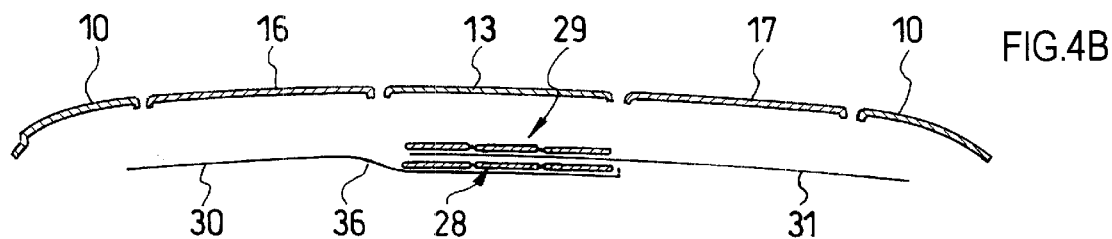
Figure 4C:
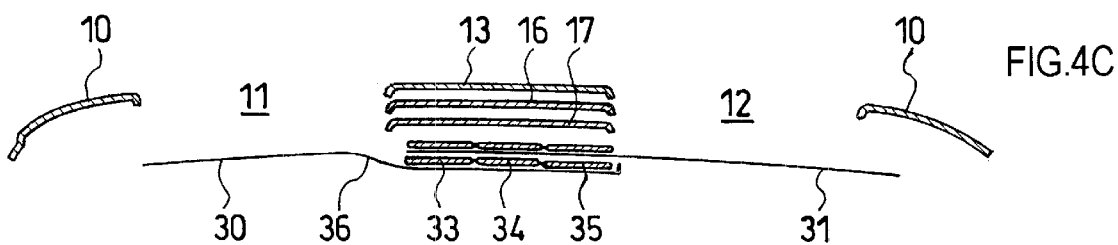

The headliner 27 shown in FIGS. 4A to 4C for the motor vehicle roof contains a front headliner unit 28 which is assigned to the front roof opening 11 or the front, especially transparent cover 16, and a rear headliner unit 29 which is assigned to the rear roof opening 11 or the rear, especially transparent cover 17. The headliner units 28, 29 are movably supported on each side of the respective roof opening on one of the guide rails 30 and 31. The rear guide rail 31 extends forward to almost under the front edge 32 of the intermediate section 13 of the roof structure 10. The front guide rail 30, which runs essentially in the area underneath the front cover 16, approximately in the same plane with the rear guide rail 31 near the motor vehicle roof, is lowered at the beginning of the intermediate section 13 of the roof structure 10 to under the rear guide rail 31 and extends underneath from it at a distance which is slightly greater than the thickness of the front headliner unit 28.

At least the front headliner unit 28 is divided in a longitudinal direction into a plurality of headliner elements 33, 34, 35, which are flexibly or pivotably connected to one another about one or more transverse axes. By dividing the headliner unit 28 into headliner elements 33, 34, 35 which are shorter in the longitudinal direction, as a result of their greater flexibility, they can follow the path 36 of the front guide rail 30 which is curved in an S-shape over a short distance (thereby reducing headroom in the smallest possible region) and can be guided into the lower deposition plane under the intermediate section 13. The rear headliner unit 29 is pushed on its guideway 31 over the front headliner unit 28 located underneath the intermediate section 13. As shown in FIG. 4C, the rear headliner unit 29 is pushed on its guideway 31 over the front headliner unit 28 located underneath the intermediate section 13 so that the two headliner units 28, 29 clear the roof openings 11, 12. The rear headliner unit 29 can also be divided into two or more headliner elements, in which the rear headliner unit 29 is guided roughly on the largely planar path of the guide rail. The plane in which the guide rails 30, 31 are essentially arranged can be flat or curved according to the shape of the roof structure.

It is noted that the displacement mechanisms for the covers and headliners have not been shown or described in specific detail since such forms no part of the invention.

Those skilled in the sunroof art, given the motions described, will easily be able to apply any of various known drive and linkage techniques to achieve the described effects.

What is claimed is:

1. A motor vehicle roof comprising:
    a fixed roof structure having a front roof opening and a rear roof opening, an intermediate section of said fixed roof structure being disposed between said front roof opening and said rear roof opening; and
    a front cover and a rear cover for respectively covering said front roof opening and said rear roof opening in a closed position, said front cover and said rear cover each being selectively movable in a longitudinal direction with respect to said fixed roof structure from said closed position into a position underneath said intermediate roof section so as to at least partially expose a respective one of said front and rear roof openings;
    wherein said front cover and said rear cover are each selectively pivotable about at least one of front and rear edges thereof from said closed position into a ventilation position such that said at least one of the front and rear edges thereof protrudes out of a plane of said fixed roof structures;
    wherein said front cover is selectively pivotable about the rear edge thereof from said closed position into said ventilation position such that the front edge of said front cover protrudes downward out of said plane of said roof structure, and wherein said rear cover is selectively pivotable about the front edge thereof from said closed position into said ventilation position such that the rear edge thereof protrudes upward and out of a plane of said fixed roof structure.

2. The motor vehicle roof as claimed in claim 1, wherein said front cover is selectively pivotable about a front edge thereof from said closed position into said ventilation position such that the rear edge of said front cover protrudes upwardly out of said plane of the fixed roof structure.

3. The motor vehicle roof as claimed in claim 2, further comprising a wind deflector positioned proximate said front cover, said wind deflector being pivotably movable about a front edge of said wind deflector so as to cause a rear edge of said wind deflector to protrude upward and out of said plane of said fixed roof structure.

4. The motor vehicle roof as claimed in claim 3, further comprising a headliner assembly including a front headliner positioned underneath said front roof opening, said front headliner being selectively guided in a common plane proximate to said fixed roof structure from a cover position to a position underneath said fixed roof section to at least partially expose said front roof opening, and a rear headliner positioned underneath said rear roof opening, said rear headliner being selectively guided in a common plane proximate to said fixed roof structure from a cover position to a position underneath said fixed roof section to at least partially expose said rear roof opening.

5. The motor vehicle roof as claimed in claim 4, wherein at least one of said front headliner and said rear headliner is divided longitudinally into at least two headliner sections which are pivotably connected to one another.

6. The motor vehicle roof as claimed in claim 5, wherein at least one of said front headliner and said rear headliner is movably supported on a first guide which essentially follows a contour path of said fixed roof structure and which extends from a position under a respective one of said front and rear covers to a position underneath said intermediate section, the other of said front headliner and said rear headliner being movably guided on a second guide which extends from a respective roof opening to a position underneath said intermediate section and said first guide.

7. The motor vehicle roof as claimed in claim 6, wherein said front headliner and said rear headliner are selectively movable independently of one another.

8. A motor vehicle roof according to claim 1, wherein said front cover is selectively pivotable about the front edge thereof from said closed position into said ventilation position such that a rear edge of said cover for said front roof opening protrudes upward and out of said plane of the fixed roof structure, and wherein said rear cover is selectively pivotable about the rear edge thereof from said closed position into said ventilation position such that a front edge of said rear cover protrudes downward and out of a plane of said fixed roof structure.

9. The motor vehicle roof as claimed in claim 8, further comprising a wind deflector positioned proximate said front cover, said wind deflector being pivotably movable about a front edge of said wind deflector so as to cause a rear edge of said wind deflector to protrude upward and out of said plane of said fixed roof structure.

10. The motor vehicle roof as claimed in claim 9, further comprising a headliner assembly including a front headliner positioned underneath said front roof opening, said front headliner being selectively guided in a common plane proximate to said fixed roof structure from a cover position to a position underneath said fixed roof section to at least partially expose said front roof opening, and a rear headliner positioned underneath said rear roof opening, said rear headliner being selectively guided in a common plane proximate to said fixed roof structure from a cover position to a position underneath said fixed roof section to at least partially expose said rear roof opening.

11. The motor vehicle roof as claimed in claim 10, wherein at least one of said front headliner and said rear headliner is divided longitudinally into at least two headliner sections which are pivotably connected to one another.

12. The motor vehicle roof as claimed in claim 11, wherein at least one of said front headliner and said rear headliner is movably supported on a first guide which essentially follows a contour path of said fixed roof structure and which extends from a position under a respective one of said front and rear covers to a position underneath said intermediate section, the other of said front headliner and said rear headliner being movably guided on a second guide which extends from a respective roof opening to a position underneath said intermediate section and said first guide.

13. The motor vehicle roof as claimed in claim 12, wherein said front headliner and said rear headliner are selectively movable independently of one another.

* * * * *